Patented Jan. 23, 1945

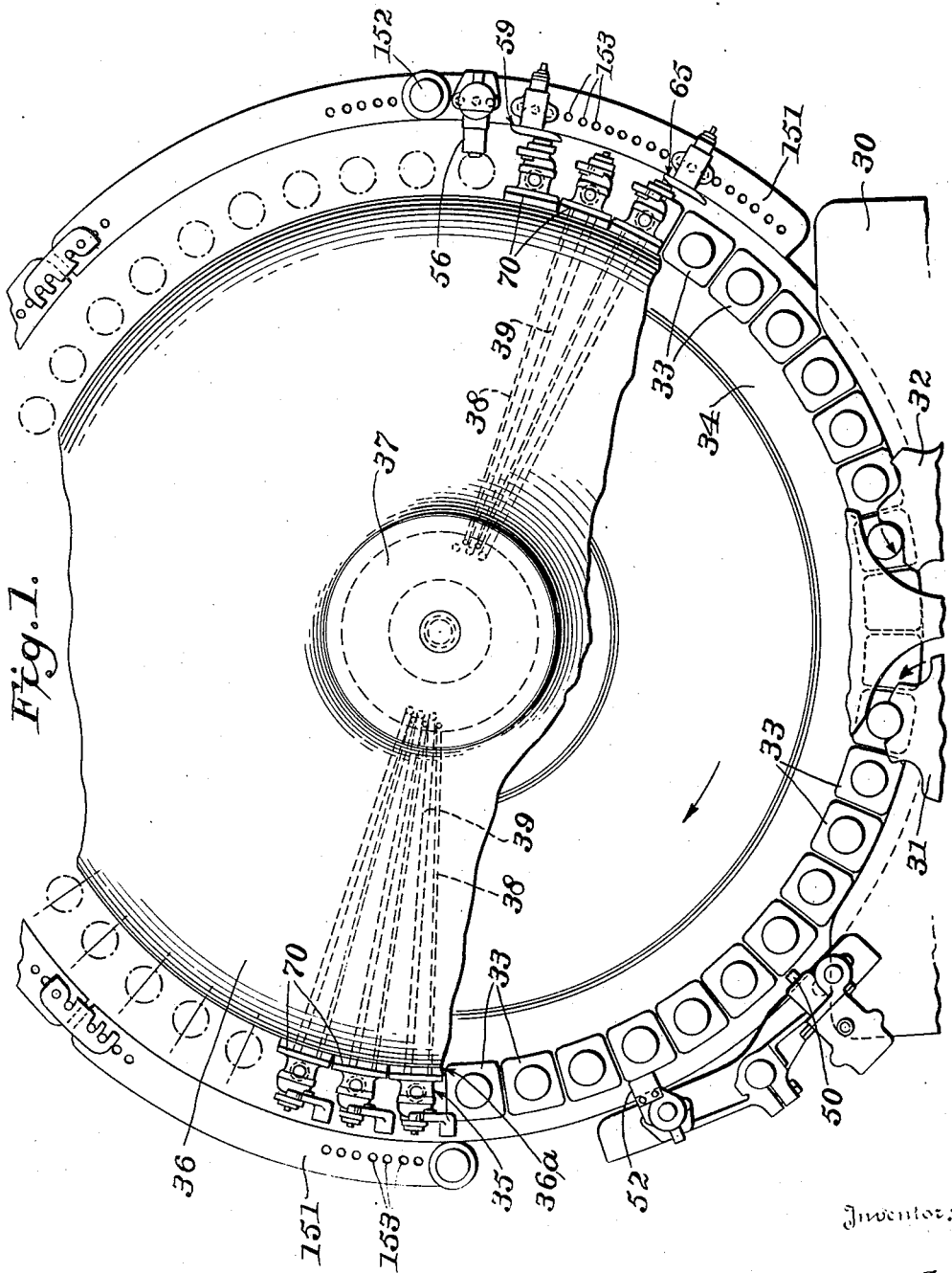

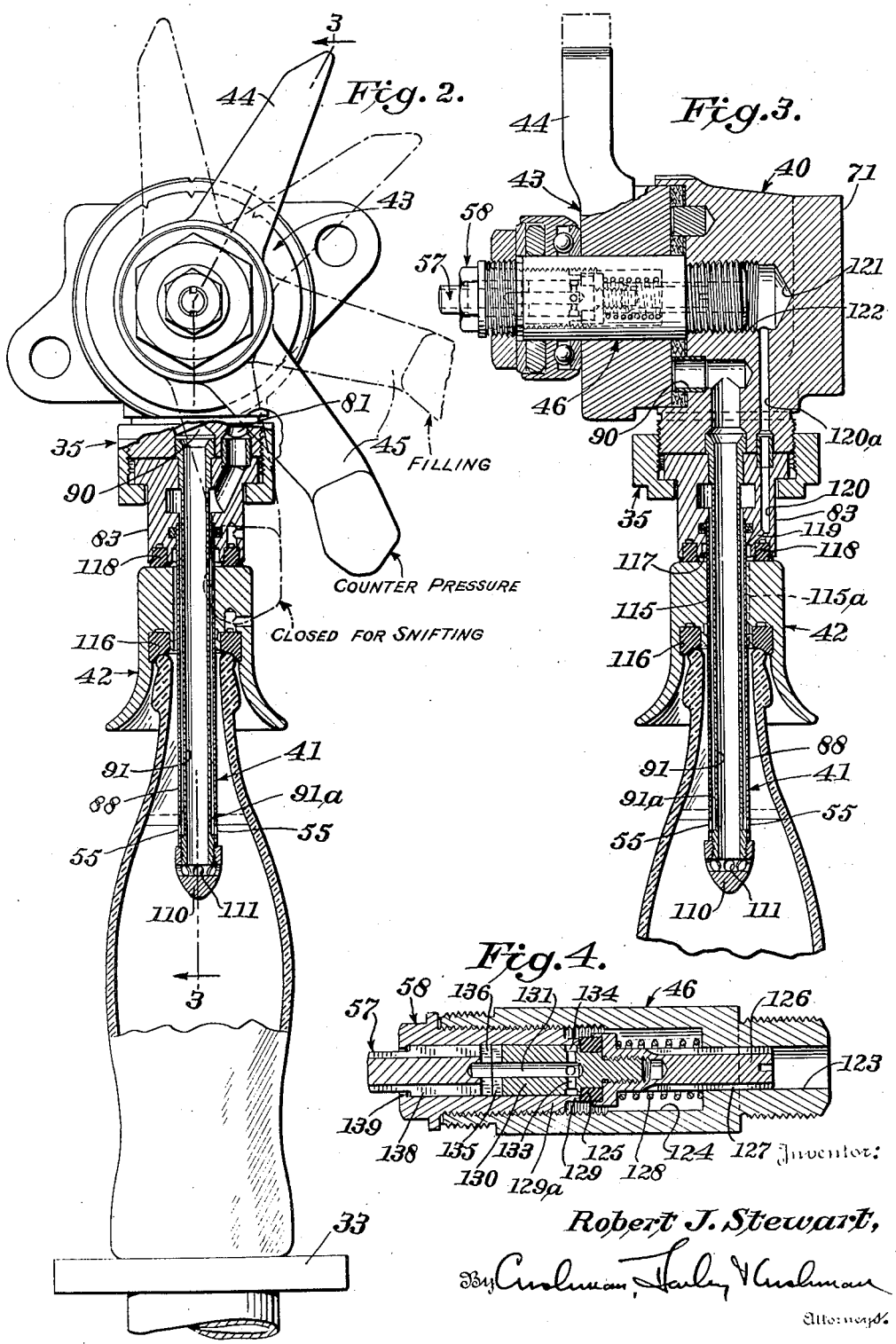

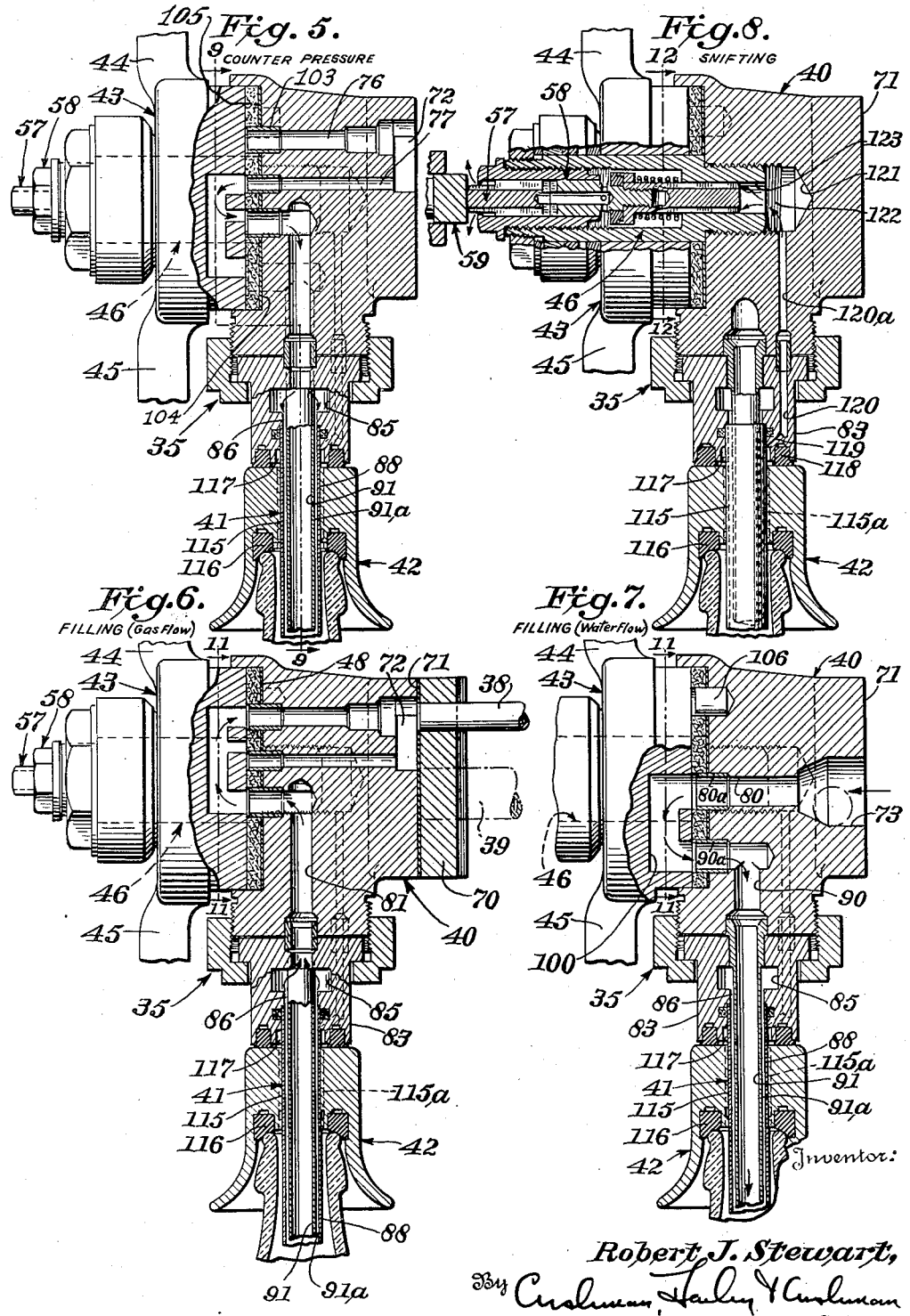

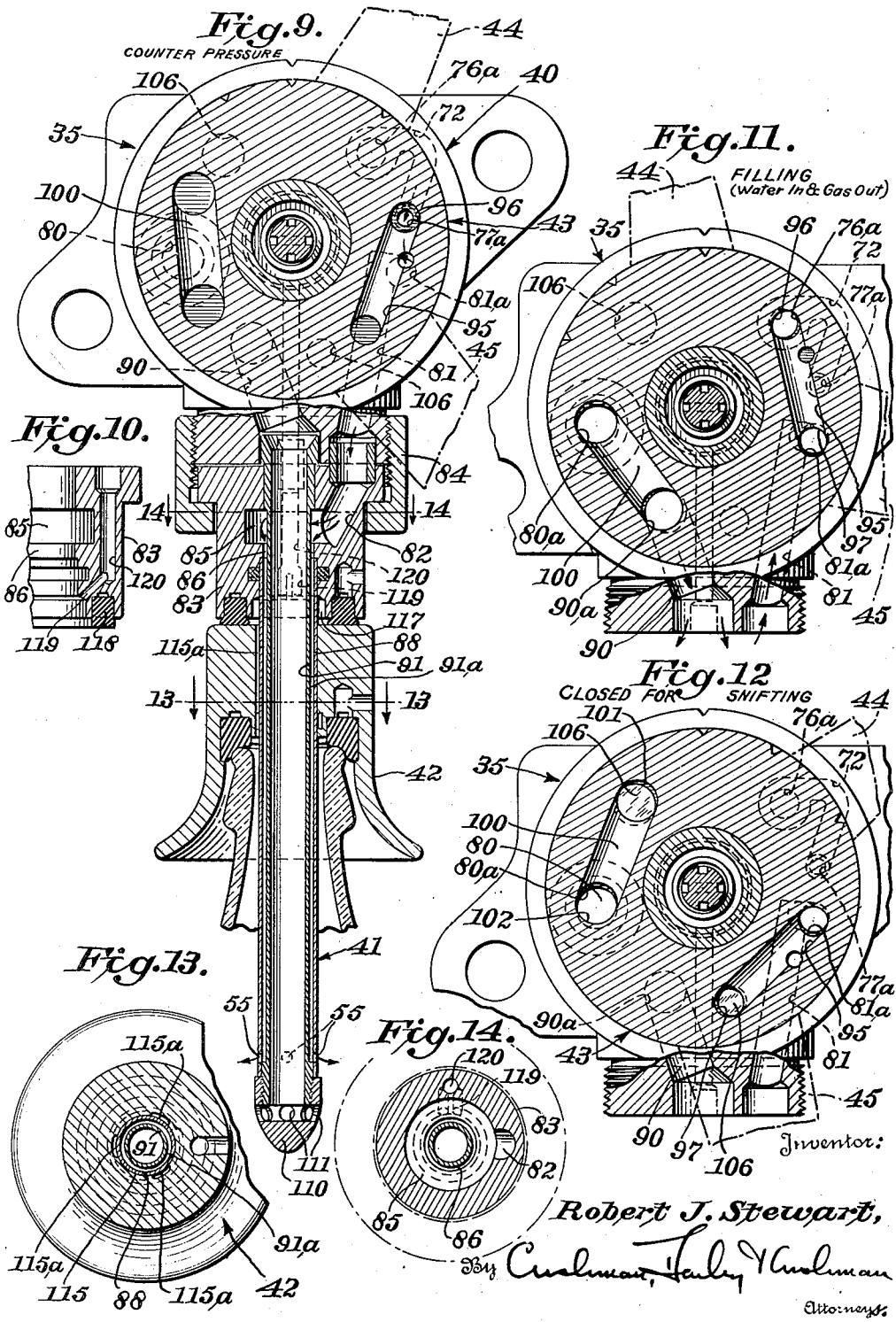

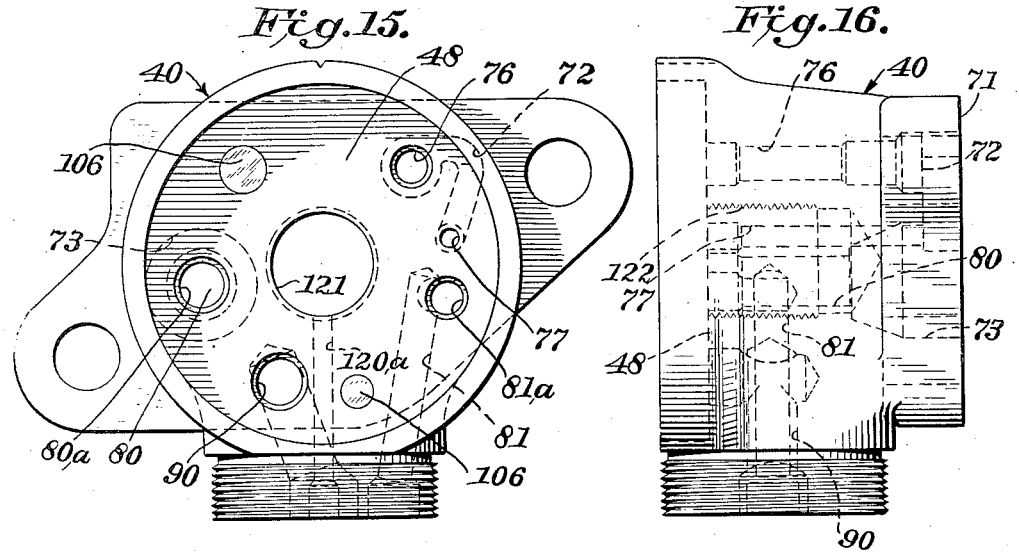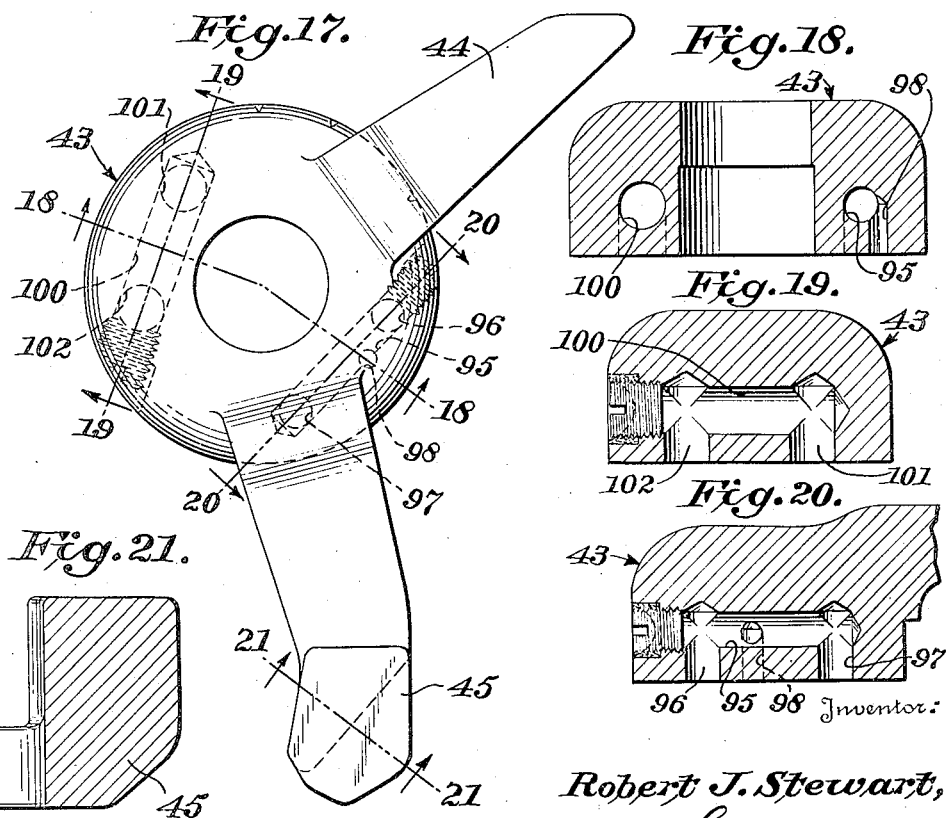

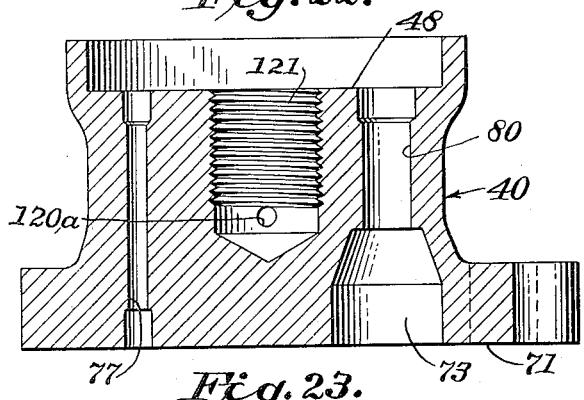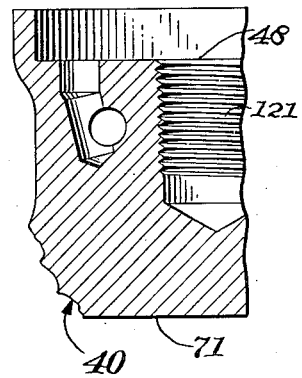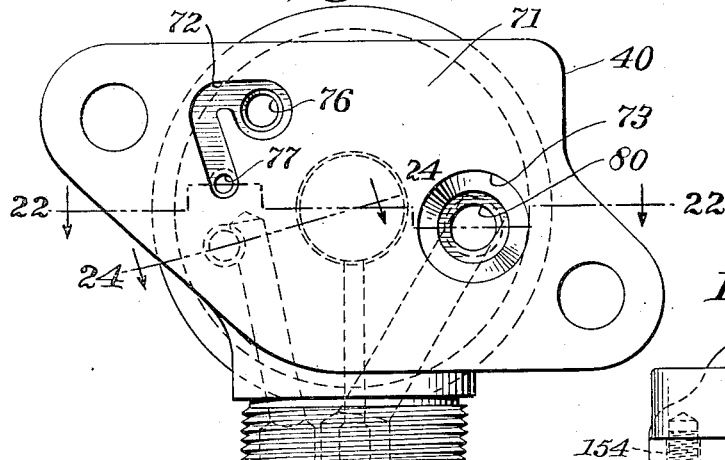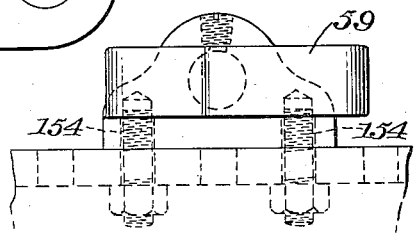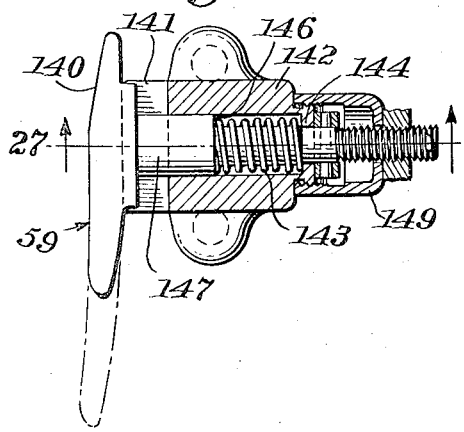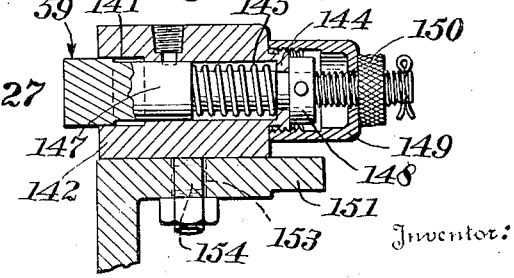

2,367,899

UNITED STATES PATENT OFFICE 2,367,899

METHOD AND APPARATUS FOR FILLING CARBONATED BEVERAGES

Robert J. Stewart, Baltimore, Md., assignor to Crown Cork & Seal Company, Inc., Baltimore, Md., a corporation of New York Application August 2, 1941, Serial No. 405,252

16 Claims. (Cl. 226—117)

The present invention relates to methods and apparatus for filling carbonated beverages.

In the filling of carbonated beverages, and particularly in the filling of soft drinks according to the gravity flow system, it is usual to provide the filling machine with a reservoir filled to a desired level with either plain carbonated water or a carbonated beverage. The space in the reservoir above the liquid level is filled with carbon dioxide gas or air or a mixture of gas and air under a suitable pressure; for example, about fifty pounds.

During the filling operation the upper portion of the reservoir is initially placed in communication with the bottle or other container so as to establish in the bottle the same pressure which exists in the upper portion of the reservoir. Then the bottle is placed in communication both with the liquid in the reservoir and with the upper portion of the reservoir through separate lines so that liquid from the reservoir may flow into the bottle, the pressure in the bottle being returned to the upper portion of the reservoir. In this way the bottle will be filled quietly because the liquid may only flow from the reservoir by gravity and no foaming will occur.

The above-mentioned flow of liquid to the bottle with a return flow of air or gas to the upper portion of the reservoir will continue until the liquid rises in the bottle to a point to cover the gas return ports in the filling nozzle. Since no further gas can then return to the reservoir, no more liquid can flow into the bottle. However, the headspace portion of the bottle above the surface of the liquid will contain gas or air at a pressure equal to that of the pressure in the reservoir; in fact, the pressure locked in the bottle headspace will be slightly higher than that in the reservoir because of the head of the liquid in the reservoir which acts to correspondingly compress the gas in the bottle headspace.

If the bottle were lowered from the filling head while its headspace contains gas or air under pressure even lower than the typical fifty pound counter-pressure referred to above, the resulting sudden escape of pressure to atmosphere through the mouth of the bottle would cause the carbonated liquid in the bottle to foam to such an extent that a substantial portion of the liquid would be wasted. It is therefore the usual practice in gravity type filling systems to snift or release all of the headspace pressure to atmosphere through a very small port in the filling head before the bottle is lowered from the filling head. If snifting could be performed through an extremely small aperture and over an extended period of time, it is probable that no agitation of the contents of the container would occur. However, filling of carbonated beverages is performed upon rotary machines which must be operated at optimum speed and it therefore becomes necessary to perform the snifting so rapidly that the contents become agitated.

Heretofore, snifting has only been regulated to the extent of preventing the liquid from foaming violently or with such impetus that it will waste a substantial portion of the container contents. More particularly, by prior practice, snifting has been carried out in such a way that though uncontrollable and violent foaming would not occur, the agitation of the liquid has been sufficient to cause foamed liquid to rise into the snifting passages of the filling head and the agitation is frequently sufficient to cause some foamed liquid to be blown to atmosphere from the outlet of the passage. Blowing of foam into the snifting passages is objectionable because it results in these passages being at least temporarily blocked against snifting of the succeeding bottle placed under that filling head.

Furthermore, any foaming of the containers such as causes foamed liquid to rise into the filling head passages or be blown to atmosphere causes some of the contents to be wasted, even if the foaming does not become uncontrollable. Any waste of the contents will affect the flavor of the beverage if the upper portion of the contents is primarily carbonated water and waste of contents also causes the liquid level of the containers to vary.

Numerous beverages are so subject to foaming that a continuous snifting of all the headspace pressure to atmosphere may result in foaming even if the snifting is extremely slow. With these beverages, the only way to avoid marked waste of liquid without a substantial increase in the snifting period is to fill the contents very slowly so that the liquid will be extremely quiet before snifting commences so that possibility of foaming during snifting will be held to a minimum. This slow filling, together with the time required for continuously snifting the entire headspace pressure to atmosphere before the bottle is lowered from the filling head, naturally holds down the output of a machine.

An important object of the present invention is to provide a method and apparatus for filling carbonated beverages at optimum speed.

Another object of the invention is to provide a method and apparatus for snifting carbonated beverage contents without possibility of causing such agitation of the beverage as to waste liquid or permit the snifting passages to be blocked by foamed liquid.

By the present apparatus and method, the snifting is preferably conducted in stages and to atmosphere, the first stage of snifting permitting a portion of the gas or air in the container headspace to be quickly released to atmosphere, but the period of snifting being so short that any agitation of the contents which will occur cannot continue long enough for foam to rise into the snifting passages. That is, the duration of snifting will be so controlled that the snifting will terminate before foam fills the container headspace. By this arrangement, blocking of the snifting passages and waste of any foam or liquid either to the snifting passages or to the atmosphere will be completely avoided.

However, the snifting which occurs through the snifting passages by the present invention will reduce the headspace pressure and permit a new equilibrium to be established between the carbonated liquid and the headspace and, after a very brief time interval has elapsed for establishment of this new equilibrium, the bottle may be lowered from the filling head to release the further pressure to atmosphere through the bottle mouth. When the bottle is lowered from the filling head, the liquid will be agitated to some extent because of the sudden release of the headspace pressure, but the present invention contemplates venting sufficient headspace pressure to atmosphere through the snifting passages before the bottle is lowered that such foaming as will occur upon lowereing of the bottle will not be sufficient to cause foam to rise above the mouth of the bottle. With some beverages, this may require more than one preliminary snift through the filling head snift passages and while the bottle is sealed to the filling head, with an interval after each such snift to permit a new equilibrium to be established within the bottle.

By the present method and apparatus, the speed of production of a given filling machine can be substantially increased. This increase is due partly to the fact that the speed at which carbonated water or beverage is flowed into the bottle during the liquid flowing or filling stage of the filling operation need not be unduly restricted. That is, no effort need be made during the liquid flowing stage to keep the liquid in such condition that foaming cannot result during snifting because, by the present invention, the snifting itself is so controlled as to prevent objectionable foaming.

Another reason for the increased rate of production is that containers need not be kept sealed to the filling heads until all of the headspace pressure has been released therefrom. More particularly, the latter portion of the release of pressure to atmosphere occurs as the bottle is lowered from the filling head.

It has heretofore been proposed to initially return a portion of the headspace pressure to a separate area of the reservoir wherein a pressure is maintained somewhat lower than that in the main reservoir. Such an arrangement necessitates a special reservoir structure as well as careful pressure control between the two reservoir sections. By the present invention, whereby all snifting occurs to atmosphere, no special reservoir structure is required.

It has also been heretofore proposed to snift in stages after complete filling, but such prior arrangements have involved balanced valve structures, thereby complicating the filling valve and requiring additional time for its operation.

A further object of the invention is to provide a snifting valve for filling head which can be quickly opened and closed, as well as a readily adjustable trip for operating such a valve.

The snifting valve provided by the present invention is of poppet form and is spring-urged to closed position. Such a valve can be quickly opened and closed by the use of a cam extending circumferentially of the filling table, the duration of open position of the valve being controlled by the length of the cam.

A further object of the invention is to provide a filling head of the rotary disc valve type including a poppet snift valve.

Filling heads of the rotary disc valve type are highly efficient and of extremely simple construction. By the present invention a filling head of this type is provided, the rotary disc valve being used to control counter-pressure and filling portions of the filling cycle, and the poppet valve being relied upon for the snifting step and preferably being positioned in the axis of the rotary disc valve to extend radially of the machine. Hence, the usual striker trips may be used for the disc valve to move it from a closed to a counter-pressure to a filling position and back to closed position, and a circumferentially extending cam or striker may be used to move the snift valve radially of the machine to open position.

Another object of the invention is to provide a supporting means for a circumferentially extending snift trip whereby the position of the latter can be readily varied and any one of a series of strikers can be rendered either operative or inoperative so that one or more of the series can be selectively used.

Other objects and advantages of the invention will be apparent from the following specification and drawings wherein:

Figure 1 is a plan view of the filling table of a filling machine with portions broken away;

Figure 2 is a front elevation of a filling head, the lower portion of the head being shown in vertical section;

Figure 3 is a vertical sectional view on the line 3—3 of Figure 2 and with the valves of the filling head in closed position;

Figure 4 is an enlarged detail view, showing the poppet type snift valve included in Figure 3 in longitudinal section;

Figure 5 is a sectional view diagrammatically showing the filling head passages aligned for counter-pressure flow;

Figure 6 is a sectional view diagrammatically showing the filling head gas flow passages aligned for gas flow from a bottle during filling;

Figure 7 is a sectional view diagrammatically showing the filling head water flow passages aligned for water flow to the bottle during filling;

Figure 8 is a sectional view diagrammatically showing the filling head snifting passages aligned for snifting flow;

Figure 9 is a vertical sectional view on the angled line 9—9 of Figure 5;

Figure 10 is an enlarged vertical sectional view of a detail of the structure shown in Figure 8;

Figure 11 is a vertical sectional view on the line 11—11 of Figures 6 and 7;

Figure 12 is a vertical sectional view on the line 12—12 of Figure 8;

Figure 13 is a horizontal sectional view on the line 13—13 of Figure 9;

Figure 14 is a horizontal sectional view on the line 14—14 of Figure 9;

Figure 15 is a front elevation of the body portion of a filling head;

Figure 16 is a side elevation of the valve body;

Figure 17 is a front elevation of a filling valve;

Figure 18 is a transverse section on the angled line 18—18 of Figure 17;

Figure 19 is a transverse section on the line 19—19 of Figure 17;

Figure 20 is a transverse section on the line 20—20 of Figure 17;

Figure 21 is a sectional view on the line 21—21 of Figure 17;

Figure 22 is a horizontal sectional view on the line 22—22 of Figure 23;

Figure 23 is a rear elevation of a valve body;

Figure 24 is a transverse section on the line 24—24 of Figure 23;

Figure 25 is a horizontal sectional view through a snifting trip;

Figure 26 is a front elevation of a snifting trip, the view looking from the left in Figures 25 and 27, and Figure 27 is a vertical sectional view on the line 27—27 of Figure 25.

*General description of structure and operation*

Referring to Figure 1, the numeral 30 designates the stationary table of a beverage filling machine provided with usual infeed and outfeed rotary dials 31 and 32. Infeed dial 31 successively positions bottles upon the filling platforms 33 reciprocably mounted upon the rotary filling table 34 and thereby beneath one of the filling heads 35 supported at the periphery of the skirt 36 of the filling superstructure. The filling reservoir 37 is centrally positioned above the skirt 36 in the usual manner so that counter-pressure gas or air flow may move to and from the filling heads 35 through the tubes 38 and carbonated water or beverage can flow to the bottles through the liquid tubes 39.

As shown in Figure 3, each filling head 35 comprises a body portion 40 which is suitably fixed to the periphery of the skirt 36 and includes a depending filling nozzle 41 having a centering bell 42 vertically slidable thereon. A rotatable disc valve 43 including a generally upstanding arm 44 and a depending arm 45 (Figure 2) is mounted for limited rotation upon the face of the valve body 40 upon a pin 46, as generally described in Huntley and Stewart Patent 2,145,765 for Filling machine, issued January 31, 1939.

As indicated in Figure 6, each filling head body portion 40 has a series of passages leading from its seat face 48 to the gas and water tubes 38 and 39 which lead to the reservoir 37. A second series of passages extends from seat face 48 to the filling nozzle 41 and the disc valve 43 has passages therein adapted to bridge the body portion passages in a certain sequence as the disc valve is oscillated on the body portion 40.

During rotation of the filling table 34 and the remainder of the filling structure a bottle will be placed beneath a filling head 35 by the infeed dial 31 and the bottle will be moved upwardly in the usual manner so that its mouth will be sealed to the filling head as shown in Figure 2. The disc valve 43 of that head will then be rotated counter-clockwise on its pin 46 by a counter-pressure trip 50 (Figure 1) so that its arms 44 and 45 will move from the dotted line position in Figure 2 marked "Closed for Snifting" to the solid line position indicated "Counter-Pressure" in Figure 2. With the disc valve in this position, gas or air in the upper portion of the reservoir 37 will flow into the bottle or other container through filling nozzle ports 55. A short further rotation of the filling structure will bring lower arm 45 in contact with filling trip 52 (Figure 1) which will further swing the valve counter-clockwise so that its arms will assume the dotted line "Filling" position of Figure 2. With the valve so positioned, carbonated water or other beverage will flow into the bottle while the pressure in the bottle will flow back to the upper part of reservoir 37. Flow of liquid into the bottle will occur until its level in the bottle reaches the point indicated by the dotted line in Figures 2 and 3 when the gas ports 55 of the filling nozzle will be covered so that no more gas can return to the reservoir, the gas above the surface of the liquid being locked in the headspace.

By this time the filling head in question will have moved approximately 210° with the filling table and its upper valve arm 44 will strike the closing trip 56 (Figure 1) which will swing the disc valve clockwise to the "closed for snifting" position of Figure 2. In this position the passages in the valve disc 43 will be out of alignment with the body portion passages so that the bottle will be entirely out of communication with reservoir 37. A moment later a plunger 57 included in a poppet valve 58 mounted in the valve axis pin 46 will contact with a cam 59 (Figures 1 and 25) causing the poppet valve to be opened to vent pressure from the bottle headspace through the passages shown in section in Figure 8 and to the open atmosphere. The detailed manner in which the cam 59, and perhaps one or more subsequently acting cams, acts to snift the headspace pressure in such a way as not to permit foam to reach the snifting passages is fully described in connection with the detailed description of the structure of the present invention.

Immediately after actuation of the poppet snift valve 58, the filling platform 33 will be lowered so that the bottle will move down from the filling head, thereby releasing to atmosphere any pressure remaining in the bottle headspace. The bottle will then be removed from platform 33 by the outfeed dial.

*The filling heads*

As stated above, the filling head of the present invention comprises a body portion 40 secured to the periphery of the filling reservoir or superstructure skirt 36 and with a gas or air tube 38 extending from its rear face to the extreme lower portion of the reservoir 37, as described in Huntley and Stewart Patent No. 2,145,765 for Filling machine, issued Jan. 31, 1939. The gas tube 38 opens to an adapter fitting 70 (Figure 6) secured to the periphery of the skirt 36. A gasket is interposed between the outer face of fitting 70 and the inner or rear face 71 of body portion 40 and the body portion is provided with a recess as 72 of substantially V-shaped form as best shown in Figure 23 which will communicate with the tube 38. Water tube 39 also extends through the adapter 70 and opens to a recess or chamber 73 in the rear face of body portion 40. As shown in Figure 7, recess 73 preferably has a ball therein to serve as a check valve in case a bottle breaks during the time the water passage is open to the bottle.

As best shown in Figures 5 and 15, the gas recess 72 has two passages extending forwardly therefrom to the front or seat face 48 of the body. The uppermost of these passages designated by the numeral 76 is of somewhat larger diameter than the lower passage 77 and passage 76 is sufficiently enlarged at its rear end to receive a small ball to serve as a check valve against sudden rush of gas or air from the top of the reservoir in the event that a bottle breaks while the gas passage is open to the bottle.

As shown in Figures 7, 15 and 22, a passage 80 extends forwardly from the water recess 73 of the front face of the body portion 40, the location of this passage with respect to the passages 76 and 77 being also illustrated in Figure 11.

In addition to the above passages extending from front to rear of the upper part of the body portion 40, the body portion is provided with a number of angled passages extending from its front or seat face 48 to its lower portion to communicate with the filling nozzle 41. One of these passages designated 81 is best shown in Figures 9 and 15. As illustrated in Figure 9, passage 81 opens to a passage 82 in a collar 83 which is held to the lower portion of the body 40 by a sleeved nut 84. Passage 82 communicates with an annular recess 85 in collar 83 and recess 85 opens to a bore and passage 86 extending downwardly and enlarged to receive the upper end of the outer tube 88 of the filling nozzle 41. As hereinafter described the passage 81 is adapted to be successively connected by the disc valve 43 to the gas passages 77 and 76.

As shown in Figures 7 and 9, the lower portion of the body 40 also includes a water passage 90 extending from the seat face and thence downwardly as shown in Figure 3 to the inner tube 91 of the filling nozzle 41.

In addition to the above described passages, the portion 40 of the filling head includes passages leading from its lower end to the poppet snift valve 58 and which are hereinafter described.

For the purpose of controlling flow through the gas and water passages of the valve body 40 described above, the disc valve 43 is provided with the substantially U-shaped passages best illustrated in Figures 17 to 20. One of these passages, designated by the numeral 95, is for the flow of gas or air to and from the bottle and is of substantially U-shape as shown in Figure 20 with end ports 96 and 97. Intermediate the length of the passage a third port 98 extends therefrom to the seat face. The other passage 100 is of the U-shaped form shown in Figure 19 and includes ports 101 and 102 extending to the seat face of the valve.

As best shown in Figure 5, the seat face ends of all of the valve body passages opening to the seat face of the valve body have sleeves 103 fitted therein which extend through a resilient gasket 104 and a leather gasket 105 to hold these gaskets against movement. The seat face of the disc valve 43 bears on the smooth face of the leather gasket 105 as described in the above-mentioned Huntley and Stewart Patent No. 2,145,765. As shown in Figure 15, at points in the gaskets where disc valve ports will be positioned out of alignment with the body portion ports, the gaskets are provided with metallic inserts 106 as described in Stewart and Gladfelter Patent No. 2,202,033 for Filling machine, issued May 28, 1940.

When the disc valve 40 is in closed position to prevent flow to and from the bottle with respect to the filling reservoir 37, the passages 95 and 100 of the disc valve will have the relation with respect to the ports of the body portion seat face diagrammatically illustrated in Figure 12. That is, in this position, port 96 of disk valve passage 95 will be substantially aligned with the seat face port 81a of gas flow passage 81 communicating with the bottle. However, the other port 97 of disk valve passage 95 will simply be opposite an insert 106. The water passage 100 of the disc valve will have its port 102 in communication with the seat face port 80a of water passage 80 communicating with the reservoir 37, but its other port 101 will be opposite a second insert 106.

It will be noted that Figure 12 shows the disk valve ports slightly out of proper alignment with the body portion ports for purpose of better illustration. The same is true of Figure 11.

When the disc valve 43 is turned counterclockwise by trip 50 from the Figure 12 position to the counter-pressure position of Figure 9 to cause gas or air to flow from the upper portion of the filling reservoir to the bottle, the ports of the valve 43 will be positioned with respect to the body portion as illustrated in Figure 9. Referring to this view, it will be observed that the port 96 of valve passage 95 is aligned with port 77a of body passage 77 which communicates with the upper portion of the filling reservoir, and that the small port 98 intermediate valve passage 95 is aligned with the body port 81a leading to filling nozzle passage 91a and the ports 55 at the lower end of the outer sleeve 88 of the filling nozzle. In the Figure 9 position of the disc valve both ends of its water passage 100 will be opposite blank portions of the leather washer 105 so that no flow of water can occur.

Figure 5, taken at right angles to Figure 9, diagrammatically shows the alignment of gas passages described above in connection with Figure 9.

Figure 11 shows the position to which the disc valve is turned by trip 52 from the Figure 9 position, Figure 11 being the "filling" position. It will be observed from Figure 11 that the gas passage 95 of the disc valve now has its end port 96 opposite the port 76a of upper gas flow passage 76 while its other end port 97 is opposite port 81a of passage 81 communicating with the ports 55 of the filling nozzle outer sleeve 88. This alignment is also diagrammatically shown in Figure 6. At the same time, the water passage 100 of the disc valve bridges the body portion port 80a of water passage 80 extending from the filling reservoir and the port 90a of water passage 90 extending to the inner tube 91 of the filling nozzle 41 and which has a nozzle 110 threaded upon its lower end provided with radial ports 111 through which water may flow into the interior of the bottle. The alignment of the water flow passages is also shown in Figure 7. It will be observed from Figure 9 that nozzle 110 supports the lower end of the outer tubing 88 of the filling nozzle to hold the latter in proper position. In addition, nozzle 110 is of sufficient diameter at its upper end to serve as a stop for the lower position of the centering bell 42.

*Filling head-poppet snift valve*

The arrangement of the passages used for snifting the bottle to atmosphere is best illustrated in Figures 3, 4, 8 and 12 and comprises the construction set forth below.

Referring to Figures 3 and 13, the centering bell 42 has a vertical bore 115 therein which surrounds the outer tube 83 of the filling nozzle and this bore includes a series of vertically extending kerfs or slots 115a which, as shown in Figure 3, open to the lower end of the bell within the packing 116 which bears upon the lip of the bottle. When centering bell 42 is in the raised position illustrated in Figures 3 and 7, the upper ends of the kerfs 115a are open to a recess 117 in the lower end of the collar 83 and which is within the packing 118 carried at the lower end of the collar to bear upon the centering bell when the latter is in raised position. From recess 117 a pair of inclined passages 119 also shown in Figures 10 and 14 extend to a vertical passage 120 in the collar 83 and which passage is aligned with a passage 120a (Figure 3) in the body portion 40 of the filling head. Passage 120a opens a central recess 121 in the body portion, and which recess is threaded at its outer portion as indicated at 122 to receive the axis pin 46 on which the disc valve 43 rotates.

As shown in Figures 3 and 4, the axis pin 46 supports the poppet valve 58 and, for this purpose, pin 46 is of hollow form including an inner reduced bore 123 and a counter-sunk bore 124. An outwardly facing poppet valve element 125 is guided within the reduced bore 123 with its head moving within the counterbore 124. Valve 125 includes an inner shank 126 which slidably engages reduced bore 123 and has longitudinal slots 127 through which flow may occur to the counterbore 124. A coil spring 128 extends between the inner portion of the counter-bore and bears upon the headed end of valve 125 to urge the latter outwardly toward a seat 129 provided at the inner end of a sleeve 129a threaded in the counter-bore 124. A suitable packing or seat member is secured in the headed end of the valve 125 to engage the seat 129. A pin or outer shank 130 is threaded to the inner shank 126 within the packing, the outer shank 130 having a longitudinal bore 131 therein which communicates at its inner end through radial ports 133 with an annular groove 134. The outer end of bore 131 opens to radially extending slots 135. The plunger 57 is also provided with diametrically extending slots 136 at its inner end opening to longitudinally extending slots 138 opening to atmosphere. Plunger 57 has a shoulder at its outer portion to normally bear against an inwardly extending shoulder 139 on the sleeve 129a. The portion of plunger 57 outwardly of shoulder 139 is of reduced diameter, but the slots 138 are of sufficient depth radially of the plunger to open to atmosphere outwardly of the shoulder.

In the operation of the poppet valve 58, when the plunger 57 and the valve are forced inwardly by a snift operating cam such as 59, as shown in Figure 8, the poppet valve will move inwardly to move the packing from the seat 129 so that flow can occur from the recess 121 in the filling head to atmosphere.

*Snift trip or cam*

Figures 1 and 25 to 27 illustrate the positioning of the snift cam trips such as 59 with respect to the filling table and also the construction of these trips. As shown in Figure 25, the cam or striker 59 may be of various lengths according to the length of the time which it is desired to have the poppet snift valve held open. Also, the lead-in end of the cam 140 is beveled so as to gradually open the poppet valve and, as illustrated in Figure 27, the cam is generally rectangular in cross section with its inner portion seated within a horizontal slot 141 provided in a bracket 142. A round bore 143 opens from the slot 141 to extend through the bracket, the bore being reduced at its far end as shown at 144 so that a spring 145 may be mounted within the bore to have its outer end bearing upon a shoulder 146 formed on a shank 147 which extends inwardly from the cam 59. Shank 147 is reduced inwardly of the shoulder 146 to enable the spring to surround the same and has a stop-collar 148 fixed thereto outwardly of bracket 142 to limit its movement toward the filling heads. A housing 149 surrounds the stop-collar and a nut 150 may be threaded upon the shank outwardly of the housing.

The bracket is adapted to be secured in various positions upon arm 151 supported by a vertical post such as 152 extending upwardly from the base of the machine, the arm 151 extending alongside the path of movement of the filling heads and being provided with spaced apertures 153 which receive bolts 154 extending downwardly from the bracket 142 and adapted to be secured in position by nuts bearing against the lower surface of the arm 151.

Spring 143 is somewhat stronger than the spring 128 of the poppet valve 58 of a filling head so that the poppet valve will be opened when it contacts with a snifting cam such as 59. However, should a valve 58 become held against opening movement, spring 145 will compress to prevent breakage.

The operative position of the cam or striker 59 can be adjusted during manufacture of the machine so that the striker will be in the proper position to open the poppet valves 58 of all of the filling heads. It is desirable to provide the machine with a number of selectively usable snifting trips during manufacture so that a filling plant may use the one or two best positioned for the beverage being filled, rendering the others inactive by threading the nut 150 inwardly upon the shank 147. However, if a trip positioned inwardly of its bracket 142 is later to be used, nut 150 need only be rotated outwardly upon the shank until the stop collar 148 contacts with the outer end of the bracket as shown in Figure 27 and at this time the trip 59 will be positioned at the proper point with respect to the bracket to operate the poppet valve without striking any other portion of the filling heads.

*Detailed operation*

The operation of a disk valve 43 and its associated poppet snift valve 58 during a filling cycle is as follows:

When a bottle is first placed on a platform 33 and is moved upwardly into the sealed relationship illustrated in Figures 2 and 3, the arms 44 and 45 of the disc valve 43 of the corresponding filling head 35 will be in the dotted line position "closed for snifting" shown in Figure 2 and its passages will be in the position with respect to the body portion 40 shown in Figure 12. As a result all of the passages opening to the valve seat face 48 will be closed and the poppet valve 58 will also be closed so that the bottle will be entirely out of communication with the reservoir 37 and will also be out of communication with the open atmosphere.

After the platform has moved a short distance in a clockwise direction due to the rotation of the filling table, the lower arm 45 of the disc valve 43 will come into contact with the counter-pressure trip 50 supported by the stationary portion of the machine. Trip 50 will swing valve 43 in a counter-clockwise direction (Figure 2) so that the valve arms will assume the "counter-pressure" position indicated in solid lines in Figure 2. In this position the passages through the filling head will be aligned in the manner diagrammatically illustrated in Figures 5 and 9 so that gas or air may flow from the upper portion of the reservoir 37 into the bottle, the pressure entering the gas through the annular passage 91$a$ of the filling nozzle 41 between tubes 88 and 91. The pressure in the bottle will thereby be made to correspond with the pressure above the carbonated water in the reservoir 37.

A short further movement of a bottle with the filling table 34 will cause the lower arm 45 of the disc valve to contact with the filling trip 52 to swing the disc valve in a counter-clockwise direction (Figure 2) to the dotted line position entitled "Filling" in Figure 2. As a result of this movement the passages provided at the filling head for flow of water will be aligned as indicated in Figure 7 so that water may flow into the bottle through the central passage or bore defined by the inner tube 91 of the filling nozzle. At the same time, gas or air flow passages of the filling head will be aligned as shown in Figure 6 so that the gas pressure in the bottle will be returned to the reservoir 37 through the outer or annular passage 91$a$. Since the reservoir and bottle are both at the same pressure the water will flow into the bottle by gravity alone, assuring a quiet filling. This flow will continue until the water rises sufficiently high to cover the ports 55 in the filling nozzle, thereby preventing further escape of gaseous fluid from the bottle to the reservoir. Due to the fact that the water in the reservoir has a head over that of the water in the bottle, the water in the bottle will ordinarily rise very slightly above the ports 55, for example, to the level indicated by the dotted lines in Figures 2 and 3, slightly compressing the gas in the head-space of the bottle, and which gas was originally at the same pressure as the gas in the upper portion of the reservoir. Figure 11 also diagrammatically shows the relation of both the water and gas passages during the filling.

The flow of water into the bottle described above will occur while the bottle is moving through somewhat more than 200° of the path of the filling table 34 so that the water may flow slowly and quietly into the bottle. The upper arm 44 of the disc valve 43 will then contact with the closing trip 56 which will rotate the disc valve in a clockwise direction back to the "closed for snifting" position of Figure 2. In this position the gas and water passages used during the counter-pressure and filling steps will be closed as shown in Figures 3 and 12 so that the bottle will be out of communication with the reservoir 37.

A very short further rotation of the filling table 34 will bring the plunger 57 of poppet valve 58 into brushing contact with a snifting cam or trip 59. Opening of the valve 58 will permit the gas in the headspace of the bottle to escape through kerfs 115$a$ in the centering bell 42 and to move through passages hereafter described to escape to the atmosphere through the passages 120 and 120$a$ best shown in Figure 8 and thence past the poppet valve. At least some pressure in the headspace of the bottle will thereby be relieved to atmosphere so that when the bottle is subsequently moved downwardly from the filling head by descent of the bottle supporting platform 33, such foaming as may occur will not be sufficient to cause foam to rise to the lip of the container; that is, the foam will not fill the headspace.

Cam 59 preferably will not be of sufficient length to hold valve 58 open long enough to permit any foam caused by the release of pressure to rise into the kerfs 115$a$ included in the snifting passage. When plunger 57 moves off cam 59 the valve will close and the carbonated water or beverage will quickly reach a new equilibrium with the headspace. The fact that an equilibrium has been established will be indicated by the substantial cessation of bubbling of the liquid, and when the equilibrium has been established the bottle may be moved downwardly from the filling head so that the remaining pressure in the headspace will vent to the atmosphere.

It is intended that by the present invention the preliminary snifting occasioned by cam 59, i. e., the snifting occurring through the snifting passages, will sufficiently reduce the headspace pressure that when the container is lowered from the filling head, the additional snifting which will then occur will not cause enough foaming to have foam rise above the lip of a container. It has already been stated that the preliminary snifting is not to cause foam to rise out of the container headspace and it will therefore be clear that by the present invention no snifting step, either preliminary or final, is to cause foam to rise to such an extent that it will reach the snifting passages or otherwise rise above the mouth of the container.

In connection with the above statement that the final snifting is not to cause foam to rise above the mouth of the container, it is to be noted that as the container lowers from the filling head, the container will move down from about the filling nozzle 41 so that a much larger area will be provided in a small bottle for the rise of foam and without the foam reaching the lip of the container. It will also be noted that when the filling nozzle leaves the liquid in the container, the level of the liquid will drop from the dotted line position of Figures 2 and 3 to the solid line position of Figure 2.

In some cases, in order to prevent foam from rising above the mouth of the container during any snifting step it may be necessary to use more than the single preliminary snift and the final snift referred to above. In such cases, a second snifting trip 65 may be located at a point slightly past the trip 59. By this arrangement, the poppet valve 58 will be opened twice to vent pressure and while foam may rise during both venting operations it will not rise into the snifting passage. Sufficient time will be provided after both snifts for equilibrium to be established between the liquid and the headspace and the bottle may then be lowered for the final snift.

A still further modification would be to entirely snift the headspace pressure by two or more snifting trips before the bottle is lowered from the filling head, with equilibrium being established after each snift prior to the last. After the last snift, which would establish atmospheric pressure in the headspace, the bottle would be lowered. By this arrangement all snifting would take place with the bottle sealed to the filling head but each snift would preferably be discontinued before foam could rise into the snifting passages. If, as just stated, equilibrium is not established after the last venting of pressure, the whole operation would preferably be so controlled that foam would not rise to the lip of the container, that is, fill the container headspace, after the container is lowered from the filling head and it might be preferable in some cases to permit equilibrium to be established after atmospheric pressure has been established in the headspace and before the bottle is lowered.

It will be observed that whatever snifting is performed by the present invention, whether performed entirely with the bottle sealed to the filling head or partially with the bottle sealed to the filling head and partially with the bottle lowered will preferably be of such duration that foam would never rise to such an extent as to either reach the snifting passages or fill the headspace. However, with some beverages and under some conditions the invention simply contemplates snifting the headspace of a filled container at spaced intervals so that objectionable foaming can be substantially prevented.

The terminology used in the specification is for the purpose of description and not of limitation, the scope of the invention being indicated in the claims.

I claim:

1. A method of filling carbonated beverages comprising flowing a carbonated liquid without interruption from a reservoir containing pressure into a container under a like counter-pressure, stopping the flow of liquid when the container has been filled to normal filling level so that the headspace is left unfilled, snifting headspace pressure from the container directly to atmosphere, stopping such snifting before all of the headspace pressure is released and before the resultant foam can fill the headspace, then permitting the liquid to reach an equilibrium with the headspace and subsequently opening the container to atmosphere.

2. A method according to claim 1 in which the snifting of pressure to atmosphere from the container headspace is effected at spaced time intervals.

3. A method of filling carbonated beverages comprising flowing a carbonated liquid without interruption from a reservoir containing pressure into a container under a like counter-pressure, stopping the flow of liquid when the container has been filled to normal filling level so that the headspace is left unfilled, snifting headspace pressure from the container directly to atmosphere, stopping such snifting before all of the headspace pressure is released and before the resultant foam can fill the headspace, and then again snifting headspace pressure to atmosphere.

4. In a filling machine, a reservoir containing carbonated liquid and a gas under pressure, a valved filling head, means to support a container in sealed relation with said filling head, means to operate said filling head to flow gas into the container from said reservoir to establish a counter-pressure in the container, means to operate said filling head to flow liquid into the container and to stop such flow when the container is filled to normal filling level so that only the container headspace is left unfilled, means to operate said filling head to then snift headspace pressure to atmosphere and to stop such snifting before the resultant foam can fill the headspace, and means to then move the container out of sealed relation with the filling head.

5. A filling machine of the character described in claim 4 wherein the means to move the container out of sealed relation with the filling head is operative at a sufficient time interval after completion of snifting that the liquid will reach an equilibrium with the container head space after snifting and before the container is moved out of sealed relation with the filling head.

6. In a filling machine, a reservoir containing carbonated liquid and a gas under pressure, a valved filling head, means to support a container in sealed relation with said filling head, means to operate said filling head to flow gas into the container from said reservoir to establish a counter-pressure in the container, means to operate said filling head to flow liquid into the container and to stop such flow when the container is filled to normal filling level so that only the container headspace is left unfilled, means to operate said filling head a plurality of times to snift headspace pressure to atmosphere and to stop each such snift before the resultant foam can fill the headspace, and means to then move the container out of sealed relation with the filling head.

7. A filling machine of the character described in claim 6 wherein each snifting means after the first-effective snifting means is operative at a sufficient time interval that the liquid will reach an equilibrium with the container head space between each snifting of the container.

8. In a filling machine, a reservoir containing carbonated liquid and a gas under pressure, a valved filling head, means to support a container in sealed relation with said filling head, means to operate said filling head to flow gas into the container from said reservoir to establish a counter-pressure in the container, means to operate said filling head to flow liquid into the container and to stop such flow when the container is filled to normal filling level so that only the container headspace is left unfilled, and means to operate said filling head to then snift headspace pressure to atmosphere and to stop such snifting before the resultant foam can fill the headspace.

9. The combination in a filling machine having a reservoir for liquid and gas, of a filling head including a valve body, the valve body having a series of ports therethrough for liquid and gas communicating with the reservoir and leading to one face of the valve body, a filling nozzle on the filling head and adapted to be positioned in a container, the valve body having a second series of ports leading from said face of the valve body to the filling nozzle, a valve mounted upon said face of the valve body and having ports therein adapted, upon seriatim movements of the valve, to bridge corresponding ports of the two series of ports in the valve body to permit gas to flow from the reservoir to a container, to subsequently permit liquid to flow from the reservoir to the container and to simultaneously vent the container to the reservoir, the valve body having a port extending from the filling nozzle to said face thereof and a poppet valve to place said last-named port in communication with the atmosphere.

10. In a filling machine, a liquid reservoir, a filling head including a body portion having a seat face and a filling nozzle, a valve rotatable on said face, the body portion and valve having passages therein adapted to be aligned by rotation of the valve upon said seat face to provide for fluid flow between the reservoir and a container positioned at the filling nozzle, a stud member positioned centrally of said seat face, said valve including a central cut-out portion fitting said stud member, said stud member being hollow and said body member including a snift passage extending from said stud member to said filling nozzle, and a poppet valve mounted in said stud member to control fluid flow through the snift passage.

11. In a container filling machine, a base, a rotary filling table, a plurality of filling heads and a liquid reservoir rotating with said table, each of said filling heads including a body portion and a disc valve rotatable on the body portion, said body portion and disc valve having passages therein adapted to be aligned by rotation of the disc valve to provide for flow between the reservoir and a container to be filled, means carried by said base and spaced about the path of rotation of said filling table to rotate each disc valve on its associated body portion to control flow between a container and said reservoir, said body portion having a passage therein having one end adapted to open to the container and the other end opening to atmosphere, a normally closed poppet valve in said last-mentioned passage, and means carried by said base to open said poppet valve.

12. A container filling machine of the character described in claim 11 wherein the means carried by the base to open the poppet valves of the filling heads comprises a plurality of selectively operable elements spaced about the path of rotation of the filling table.

13. In a container filling machine, a rotary filling structure including filling head valves movable toward and from the axis of rotation of the rotary structure, and movable to open position by movement toward said axis, means positioned in the path of rotary movement of said structure to operate said valves, said valve-operating means being mounted for movement toward and from the axis of rotation of said structure, and means to normally hold said valve operating means projected toward the axis of rotation of said filling structure.

14. A container filling machine of the character described in claim 13 including means to move said valve operating means away from the axis of rotation of said filling structure.

15. In a container filling machine, a rotary filling structure including filling head valves movable toward and from the axis of rotation of the rotary structure, and movable to open position by movement toward said axis, resilient means to normally hold said valve away from said axis, means positioned in the path of rotary movement of said structure to operate said valves, said valve-operating means being mounted for movement toward and from the axis of rotation of said structure, resilient means to normally hold said valve away from said axis, and means to normally hold said valve operating means projected toward the axis of rotation of said filling structure, said last-named resilient means exerting more force than said first-named resilient means.

16. A method of filling carbonated beverages comprising flowing a carbonated liquid without interruption from a reservoir containing pressure into a container under a like counter-pressure, stopping the flow of liquid when the container has been filled to normal filling level so that the headspace is left unfilled, snifting headspace pressure from the container directly to atmosphere, stopping such snifting before all of the headspace pressure is released and before the resultant foam can fill the headspace, then permitting the liquid to reach an equilibrium with the headspace, and subsequently again shifting headspace pressure to atmosphere.

ROBERT J. STEWART.